United States Patent
Li et al.

(10) Patent No.: US 10,801,858 B2
(45) Date of Patent: Oct. 13, 2020

(54) MAP BASED NAVIGATION METHOD, APPARATUS AND STORAGE MEDIUM

(71) Applicant: Baidu Online Network Technology (Beijing) Co., Ltd., Beijing (CN)

(72) Inventors: Dongmin Li, Beijing (CN); Weihao Gu, Beijing (CN); Yang Yu, Beijing (CN); Huirong Yang, Beijing (CN); Haoran Yu, Beijing (CN); Minghao Lei, Beijing (CN); Zijia Liu, Beijing (CN); Nanhao Qin, Beijing (CN); Chong Zhou, Beijing (CN); Zhengtao Zhu, Beijing (CN); Xintao Chen, Beijing (CN); Wenbin Mou, Beijing (CN); Yang Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 69 days.

(21) Appl. No.: 16/146,461

(22) Filed: Sep. 28, 2018

(65) Prior Publication Data
US 2019/0033089 A1 Jan. 31, 2019

Related U.S. Application Data

(63) Continuation of application No. PCT/CN2016/096103, filed on Aug. 19, 2016.

(30) Foreign Application Priority Data

Mar. 31, 2016 (CN) .......................... 2016 1 0200889

(51) Int. Cl.
*G01C 21/36* (2006.01)
*G01C 21/34* (2006.01)

(52) U.S. Cl.
CPC ....... *G01C 21/367* (2013.01); *G01C 21/3415* (2013.01); *G01C 21/3626* (2013.01); *G01C 21/3629* (2013.01); *G01C 21/3641* (2013.01)

(58) Field of Classification Search
CPC ............ G01C 21/3415; G01C 21/3626; G01C 21/3629; G01C 21/3641; G01C 21/367
(Continued)

(56) References Cited

U.S. PATENT DOCUMENTS 6,707,421 B1 * 3/2004 Drury ................ G01C 21/3415
342/357.31
8,103,439 B2    1/2012 Onishi et al.
(Continued)

FOREIGN PATENT DOCUMENTS

CN         1950863 A       4/2007
CN       101661093 A       3/2010
(Continued)

OTHER PUBLICATIONS

International Search Report dated Jan. 5, 2017 for International Application No. PCT/CN2016/096103, 7 pages.
(Continued)

*Primary Examiner* — Atul Trivedi
(74) *Attorney, Agent, or Firm* — Knobbe, Martens, Olson & Bear, LLP

(57) ABSTRACT

A map based navigation method, apparatus and storage medium. The method includes: acquiring a location status of a user terminal carrying a navigation client and a navigation operation of a user; and switching automatically between at least two types of navigation pages of the navigation client, based on the location status of the user terminal and the navigation operation of the user. This method can achieve an
(Continued)

acquiring a location status of a user terminal carrying a navigation client and a navigation operation of a user — S110 switching automatically between at least two types of navigation pages of the navigation client, based on the location status of the user terminal and the navigation operation of the user — S120 automatic switching between different types of navigation pages and satisfy different needs of the user in different situations.

18 Claims, 4 Drawing Sheets

(58) Field of Classification Search
USPC .......................................................... 701/411
See application file for complete search history.

(56) References Cited

U.S. PATENT DOCUMENTS

| | | | | |
|---|---|---|---|---|
| 8,750,898 | B2* | 6/2014 | Haney | H04W 12/08 |
| | | | | 455/456.1 |
| 9,300,779 | B2* | 3/2016 | Langlois | H04M 1/6091 |
| 9,412,275 | B2* | 8/2016 | Khoe | G08G 1/13 |
| 9,597,014 | B2* | 3/2017 | Venkatraman | A61B 5/0002 |
| 9,973,887 | B2* | 5/2018 | Harding | G01C 21/3667 |
| 10,437,460 | B2* | 10/2019 | Moore | G06F 3/04883 |
| 2004/0145457 | A1* | 7/2004 | Schofield | H04N 7/18 |
| | | | | 340/425.5 |
| 2007/0063875 | A1* | 3/2007 | Hoffberg | G01C 21/28 |
| | | | | 340/995.1 |
| 2008/0288166 | A1 | 11/2008 | Onishi et al. | |
| 2009/0031006 | A1* | 1/2009 | Johnson | G06F 16/9537 |
| | | | | 709/218 |
| 2012/0109516 | A1 | 5/2012 | Miyazaki et al. | |
| 2013/0127980 | A1* | 5/2013 | Haddick | G02B 27/0093 |
| | | | | 348/14.08 |
| 2013/0158860 | A1 | 6/2013 | Gum | |
| 2013/0285855 | A1* | 10/2013 | Dupray | G01S 19/48 |
| | | | | 342/451 |
| 2014/0309806 | A1* | 10/2014 | Ricci | G06Q 10/20 |
| | | | | 701/1 |
| 2014/0309870 | A1* | 10/2014 | Ricci | G05D 23/1917 |
| | | | | 701/36 |
| 2015/0077502 | A1* | 3/2015 | Jordan | G06F 3/04847 |
| | | | | 348/14.03 |
| 2015/0241230 | A1* | 8/2015 | Davidson | G06K 9/00812 |
| | | | | 701/533 |
| 2016/0061617 | A1* | 3/2016 | Duggan | G06F 16/248 |
| | | | | 701/538 |
| 2016/0258773 | A1* | 9/2016 | Santilli | G06Q 10/0833 |
| 2017/0132713 | A1* | 5/2017 | Bowne | B60W 40/09 |
| 2019/0360823 | A1* | 11/2019 | Nelson | H04W 4/024 |

FOREIGN PATENT DOCUMENTS

| | | |
|---|---|---|
| CN | 102261917 A | 11/2011 |
| CN | 102445211 A | 5/2012 |
| CN | 104019808 A | 9/2014 |
| CN | 104114978 A | 10/2014 |
| CN | 105865481 A | 8/2016 |
| JP | H0883399 A | 3/1996 |
| JP | 2006145225 A | 6/2006 |
| JP | 20063130 A | 11/2006 |
| JP | 2012042481 A | 3/2012 |
| KR | 10-2013-0041548 A | 4/2013 |

OTHER PUBLICATIONS

Written Opinion of the International Searching Authority dated Jan. 5, 2017 for International Application No. PCT/CN2016/096103, 4 pages.

* cited by examiner

MAP BASED NAVIGATION METHOD, APPARATUS AND STORAGE MEDIUM

CROSS-REFERENCE TO RELATED APPLICATIONS

This application is a continuation of International Application PCT/CN2016/096103, with an international filing date of Aug. 19, 2016, which claims priority to Chinese Patent Application no. 201610200889.7, filed with the China National Intellectual Property Administration (CNIPA) on Mar. 31, 2016, the contents of which are incorporated herein by reference in their entirety.

TECHNICAL FIELD

The present disclosure relates to the field of navigation technology, specifically relates to a map based navigation method, apparatus and storage medium.

BACKGROUND

With the continuous development of navigation technologies, various navigation terminals have been widely used in one's daily work and lives. After a user sets the start and the destination, a navigation terminal can calculate various feasible routes between the two and navigate based on one of the routes selected by the user, so as to enable the user to easily reach the destination from the start.

For example, when the user drives a vehicle and is quite familiar with the road condition, she can drive properly by using a driving page on the navigation terminal (an interface without navigation information), without entering the interface having the navigation information. Since the driving page displays the route from the start to the destination and nearby route information through a map, it basically satisfies the needs of the user.

However, some users are not entirely familiar with the entire route. The users are familiar with part of the route and not familiar with other parts of the route. When the users are driving on a comparatively familiar route, they may view a non-navigation page, and when the users are driving on an unfamiliar route, they may view the navigation page. However, when a switching is performed between the non-navigation page and the navigation page, in the conventional technique, the page switching is usually performed by using the manual operation mode in the navigation page or by using a remoter, the operation is inconvenient and cannot achieve an automatic switching to satisfy the different needs of the user.

SUMMARY

Embodiments of the present disclosure provide a map based navigation method, apparatus and storage medium, which can achieve an automatic switching between different types of navigation pages and satisfy different needs of the user.

In a first aspect, the embodiments of the present disclosure provide a map based navigation method, the method includes:

acquiring a location status of a user terminal carrying a navigation client and a navigation operation of a user; and switching automatically between at least two types of navigation pages of the navigation client, based on the location status of the user terminal and the navigation operation of the user.

In a second aspect, the embodiments of the present disclosure further provide a map based navigation apparatus, the apparatus includes:

a location status and navigation operation acquisition module, configured to acquire a location status of a user terminal carrying a navigation client and a navigation operation of a user; and a navigation page switch module, configured to switch automatically between at least two types of navigation pages of the navigation client, based on the location status of the user terminal and the navigation operation of the user.

In a third aspect, the embodiments of the present disclosure provide one or more storage medium containing computer-executable instructions, when executed by a computer processor, perform a map-based navigation method, the method includes:

acquiring a location status of a user terminal carrying a navigation client and a navigation operation of a user; and switching automatically between at least two types of navigation pages of the navigation client, based on the location status of the user terminal and the navigation operation of the user.

The technical solution provided by the embodiments of the present disclosure achieves an automatic switching between at least two types of navigation pages of the client based on the location status of the user terminal and the navigation operation of the user, and satisfies different needs of the user.

BRIEF DESCRIPTION OF THE DRAWINGS

To describe the technical solution in the embodiments of the present disclosure more clearly, the following briefly introduces the accompanying drawings required for describing the embodiments. Apparently, the accompanying drawings in the following description are merely some embodiments of the present disclosure, for those of ordinary skill in the art, these accompanying drawings may also be modified and replaced without creative work.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure rather than the whole structure are shown in the accompanying drawings.

The First Embodiment

Figure 1:
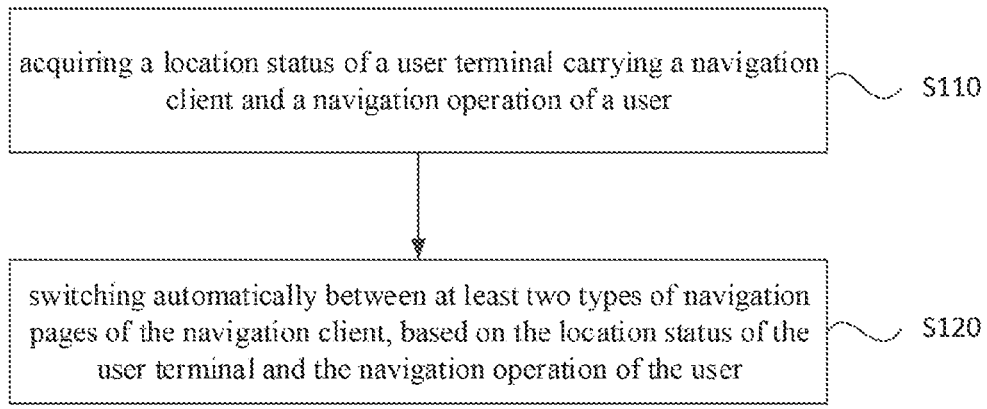
FIG. 1 is a flowchart of a map based navigation method according to the first embodiment of the present disclosure.

FIG. 1 is a flowchart of a map based navigation method according to the first embodiment of the present disclosure. The method may be performed by a map based navigation apparatus. The apparatus may be executed by means of hardware and/or software and may generally be configured in a client, or in a server, executed by the server by controlling the client. The present embodiment is illustrated by taking the client as an example. As shown in FIG. 1, the method of the present embodiment specifically includes:

S110: acquiring a location status of a user terminal carrying a navigation client and a navigation operation of a user.

In the present embodiment, the user terminal may be a navigation terminal such as a mobile phone, a tablet computer, or a vehicle-mounted navigation instrument. The location status of the user terminal may include information such as the location of the user terminal, the traveling speed of the user terminal, the travelling distance of the user terminal. The navigation operation of the user may be understood as a sliding or clicking on the current navigation page performed by the user, or a manual switching operation performed by the user terminal on different navigation interfaces. Alternatively, the navigation operation of the user may also be understood as a route query, a map zooming-in or zooming-out and other operations performed on the current navigation page.

S120, switching automatically between at least two types of navigation pages of the navigation client, based on the location status of the user terminal and the navigation operation of the user.

Based on the location status of the user terminal and the navigation operation of the user, it is possible to identify whether the user terminal has the condition of driving in the navigation route, and the need to acquire information on the current navigation page, and thus determine what level of navigation information the user is currently in need of, and further achieve the automatic switching between different types of navigation pages. Different types of navigation pages are mainly differentiated based on the different levels of navigation information provided.

Illustratively, the switching automatically between at least two types of navigation pages of the navigation client, based on the location status of the user terminal and the navigation operation of the user includes: switching, if the location status of the user terminal satisfies a condition of driving in a navigation route, a current navigation page is stayed on for a first set time threshold value, and if the user has no operation on the current navigation page for a preset time before the switching, from the current navigation page at a low level to a navigation page at a high level, wherein levels of the at least two types of navigation pages are arranged in ascending order of an amount of navigation information.

The user terminal is currently in a drivable condition, indicating that the user may be provided with a navigation page having navigation information; the current navigation page is stayed on for the first set time threshold value, indicating that the current navigation page may provide navigation information for the user, and the user does not need to enter a more complex navigation page; the user has no operation on the current navigation page for a preset time before the switching, indicating that the user may not need to acquire more information on the navigation page at a low level, so that a higher level navigation page may be switched to.

In the present embodiment, determining the location status of the user terminal satisfies the condition of driving in the navigation route includes: if a current location of the user terminal is located at a start of the navigation route, and a travelling speed of the user terminal reaches a vehicle driving speed value, determining the location status of the user terminal satisfies the condition of driving in the navigation route. Here, the travelling speed of the user terminal may be understood as the average speed from the start of the navigation route over a preset distance or within a preset time, or may also be understood as the maximum driving speed of the user terminal from the start of the navigation route over a preset distance or within a preset time. The specific criterion for determining the travelling speed of the user terminal is set according to the actual situation. In the present embodiment, the driving speed of the vehicle is preferably 10 km/h.

In the present embodiment, the current navigation page is stayed on for a first set time threshold value may be understood as that the level or type of the navigation page does not change over the time of the first set time threshold value, and the first set time threshold value is preferably 1 min. That is, the level or type of the navigation page does not change in 1 min. Within the 1 min, the user may perform operations such as the map zooming-in, zooming-out and route inquiry in the current navigation page, but the level of the navigation page does not change. The user may also have no operation on the current navigation page, and the level of the navigation page does not change, either.

In the present embodiment, the user has no operation on the current navigation page for a preset time before the switching may be understood as that the user does not operate on the current navigation page for the preset time before the current navigation page is switched, that is, the user does not perform operations such as map zooming-in or zooming-out, and route inquiry on the current navigation page. The user may set the preset time in the navigation page according to personal needs, and the preset time is preferably 10 s. Here, the preset time before the current navigation page is switched may be the last 10 s in the first set time threshold value, or 10 s of time elapses by taking the terminal point of the first set time threshold value as the start. For example, when the first set time threshold value is 1 min and the preset time is 10 s, if the location status of the user terminal satisfies the driving condition of the navigation route and the current navigation page is stayed on for 1 min, and the user does not perform operations on the current navigation page during the 50th to the 60th second of the time of the 1 min' stay on the current navigation page, the user does not operate on the current navigation page, thus the navigation client switches from the current navigation page at a low level to the navigation page at a high level. Or if the location status of the user terminal satisfies the driving condition of the navigation route and the current navigation page is stayed on for 1 min, 10 s of time elapses after the current navigation page is stayed on for 1 min, and, the user does not perform any operations on the current navigation page within the time of 10 s, thus the navigation client switches from the current navigation page at a low level to the navigation page at a high level.

If the location status of the user terminal does not satisfy the driving condition in the navigation route, when the user wants to switch the navigation page, he/she may adopt the manual operation mode on the navigation page and switch from the current navigation page at a low level to the navigation page at a high level. The start of the navigation route may be either the original start input by the user when initiating the navigation, or the start of the current navigation route. Since the navigation route may be continuously refreshed with the time or the movement of the location of the user terminal, the start of the navigation route is continuously refreshed.

In the present embodiment, the navigation page at a low level is preferably a non-navigation page, and the navigation page at a high level is preferably a light navigation page. The traditional navigation page is a navigation page at a higher level. The navigation page at a low level has less navigation information, and the navigation page at a high level has more navigation information. Here, compared with the traditional navigation, the scales of the non-navigation page and the light navigation page are smaller, and the range of the information such as the displayed route and the road condition is large, so that the navigation information of the area or the city where the user terminal is located can be displayed, and the specific displayed range may be adjusted by the user. The traditional navigation page displays, however, only the information such as the route near the user terminal and the road condition. Therefore, the switching from the non-navigation page to the light navigation page enables the user to understand the information such as the route, the road condition in a lager range, and can provide guidance information for driving when the user is unfamiliar with the route. If the user needs to learn the information such as the route near the current location of the user terminal and the road condition in detail, he/she may switch the non-navigation page to the traditional navigation page by using the manual operation mode; or switch the light navigation page to the traditional navigation page by using the manual operation mode.

In the non-navigation page, voice broadcast is not conducted to guide the driving of the user terminal, and the driving of the user terminal is not guided. In the light navigation page, however, voice broadcast may be conducted and a small amount of guidance information may be displayed.

The map based navigation method provided by the present embodiment achieves an automatic switching between at least two types of navigation pages of the client based on the location status of the user terminal and the navigation operation of the user, and can satisfy different needs of the user. This technical solution is especially suitable for the automatic switching process from the non-navigation page to the light navigation page.

The Second Embodiment

Figure 2A:
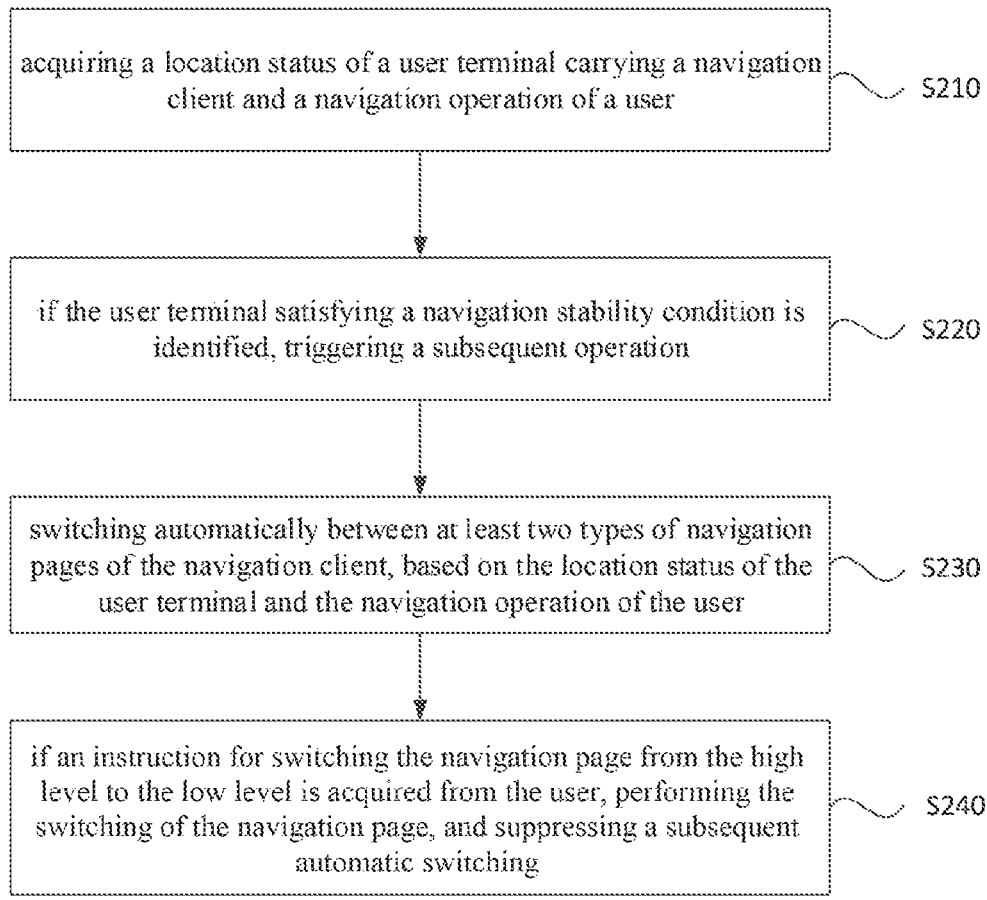
FIG. 2a is a flowchart of a map based navigation method according to the second embodiment of the present disclosure.

FIG. 2a is a flowchart of a map based navigation method according to the second embodiment of the present disclosure. Based on the above first embodiment, before the switching automatically between at least two types of navigation pages of the navigation client, based on the location status of the user terminal and the navigation operation of the user, the method further includes:

if the user terminal satisfying a navigation stability condition is identified, triggering a subsequent operation.

Thus, limiting the operation of switching automatically the navigation page through the identification of the navigation stability condition is conducive to the subsequent determination of the location status of the user terminal.

Further, after the switching automatically between at least two types of navigation pages of the navigation client, based on the location status of the user terminal and the navigation operation of the user, the method further includes:

if an instruction for switching the navigation page from the high level to the low level is acquired from the user, performing the switching of the navigation page, and suppressing a subsequent automatic switching.

Thus, the suppression of the subsequent automatic switching is achieved, and the different needs of the user in different situations are satisfied, through the switching from the navigation page at a high level to the navigation page at a low level.

Based on the above optimization, as shown in FIG. 2a, the technical solution of the present embodiment is specifically as follows:

S210: acquiring a location status of a user terminal carrying a navigation client and a navigation operation of a user.

S220: if the user terminal satisfying a navigation stability condition is identified, triggering a subsequent operation.

In the present embodiment, the navigation stability condition includes at least one of the following: GPS positioning information in a set time length is continuously acquired; and a travelling location of the user terminal on the current navigation page reaches a set distance threshold value.

Here, the GPS positioning information can be continuously acquired in a set time length, which enables the user terminal to monitor the location in real time. When the current navigation page is a non-navigation page, in the non-navigation page, the travelling location of the user terminal reaches the set distance threshold value may be understood as that the travelling location of the user terminal reaches the set distance threshold value in a set time interval. Because there is an error in locating the user terminal by GPS, when the travelling location of the user terminal reaches the distance threshold value, the parameters such as the driving speed of the user terminal can be accurately determined. In the present embodiment, the set distance threshold value is preferably 50 m.

S230, switching automatically between at least two types of navigation pages of the navigation client, based on the location status of the user terminal and the navigation operation of the user.

S240, if an instruction for switching the navigation page from the high level to the low level is acquired from the user, performing the switching of the navigation page, and suppressing a subsequent automatic switching.

In the present embodiment, in the navigation process, the switching from the navigation page at a high level to the navigation page at a low level may also be performed by using the manual operation mode. When the navigation page is switched from the high level to the low level, the current navigation page at a low level can no longer be automatically switched to the navigation page at a high level, and only through the manual operation mode can the navigation page at a low level be switched to the navigation page at a high level. For example, when the current navigation page is a light navigation page, if the user needs to navigate by referring to a non-navigation page, the user manually operates on the navigation page to switch the light navigation page to the non-navigation page. However, after the light navigation page is switched to the non-navigation page, the non-navigation page cannot be automatically switched to the light navigation page based on the foregoing switching condition, and the manual operation mode must be adopted to realize the operation of switching from the non-navigation page to the light navigation page. Since the user's manual switching operation may indicate that the automatic switching performed based on the foregoing switching condition does not accord with the user's intention, it should be suppressed. Through the above method, the user's need to drive for a long time by referring to the non-navigation page is satisfied.

Figure 2B:
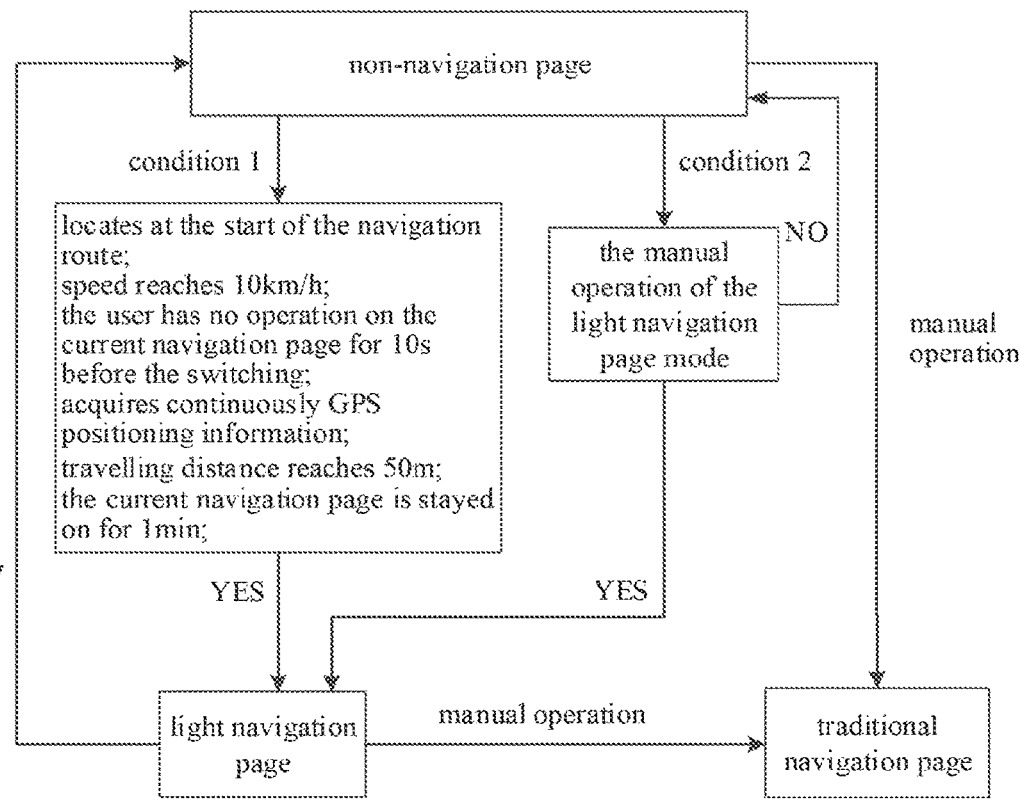
FIG. 2b is an interaction diagram of switching various navigation pages according to the second embodiment of the present disclosure.

Based on the above embodiments, when the switching is performed automatically between at least two types of navigation pages of the navigation client based on the location status of the user terminal and the navigation operation of the user, the navigation stability condition may be synchronized with the location status of the user terminal and the navigation operation of the user. Therefore, the switching automatically between at least two types of navigation pages of the client may also be realized through at least one of the navigation stability conditions, the location status of the user terminal, and the navigation operation of the user. For example, as shown in FIG. 2b, when realizing the switching from the non-navigation page to the light navigation page, only condition 1 or condition 2 needs to be satisfied.

Here, the condition 1 includes: the user terminal is located at the start of the navigation route, the speed of the user terminal reaches 10 km/h, the user does not operate on the current navigation page for 10 s before the switching, the user terminal continuously acquires the GPS positioning information in a set time length, and the travelling distance of the user terminal reaches 50 m, and the current navigation page is stayed on for 1 min. When driving on the non-navigation page, if all terms in condition 1 are satisfied, the automatic switching from the non-navigation page to the light navigation page may be realized. Or if at least four or at least five of the terms of conditions 1 are satisfied, the automatic switching from the non-navigation page to the light navigation page may be realized, and the specific criteria satisfying condition 1 may be set specifically. When the light navigation page is switched to the non-navigation page, the non-navigation page cannot be automatically switched to the light navigation page. If the non-navigation page needs to be switched to the light navigation page again, condition 2 needs to be satisfied.

The condition 2 is preferably the manual operation of the light navigation page mode, that is, it is required to click or slide the light navigation page mode manually to realize the switching from the non-navigation page to the navigation page. When condition 1 is not satisfied and the user needs to switch the non-navigation page to the light navigation page, the manual operation of the light navigation page mode in condition 2 may be adopted.

For condition 1, after the statistics of historical data, in the non-navigation page, some users familiar with the route will exit the page after viewing the map route, and some other users not familiar with the route will click and open the navigation after viewing the map route, that is, enter the traditional navigation page, and these two parts of the users usually stay on the non-navigation page for less than 1 minute. In addition to these users, there are still some users who want to continue to view the map route, but do not need to enter the traditional navigation page to consume more power and resources. Such users are suitable for entering the light navigation page. These users will stay on the non-navigation page for more than 1 minute, and the automatic switching to the light navigation page may be realized. For such users, if no operation is performed for 10 seconds before the switching, it indicates that the users do not need to view the current map route in detail, and thus the switching may be realized.

The present embodiment provides a map based navigation method. Based on the foregoing embodiments, the step of "if the user terminal satisfying a navigation stability condition is identified, triggering a subsequent operation" is added, which is conductive to the subsequent determination of the location status of the user terminal; and the "if an instruction for switching the navigation page from the high level to the low level is acquired from the user, performing the switching of the navigation page, and suppressing a subsequent automatic switching" is added, enabling the switching of the navigation page to satisfy the user's needs.

The Third Embodiment

Figure 3:
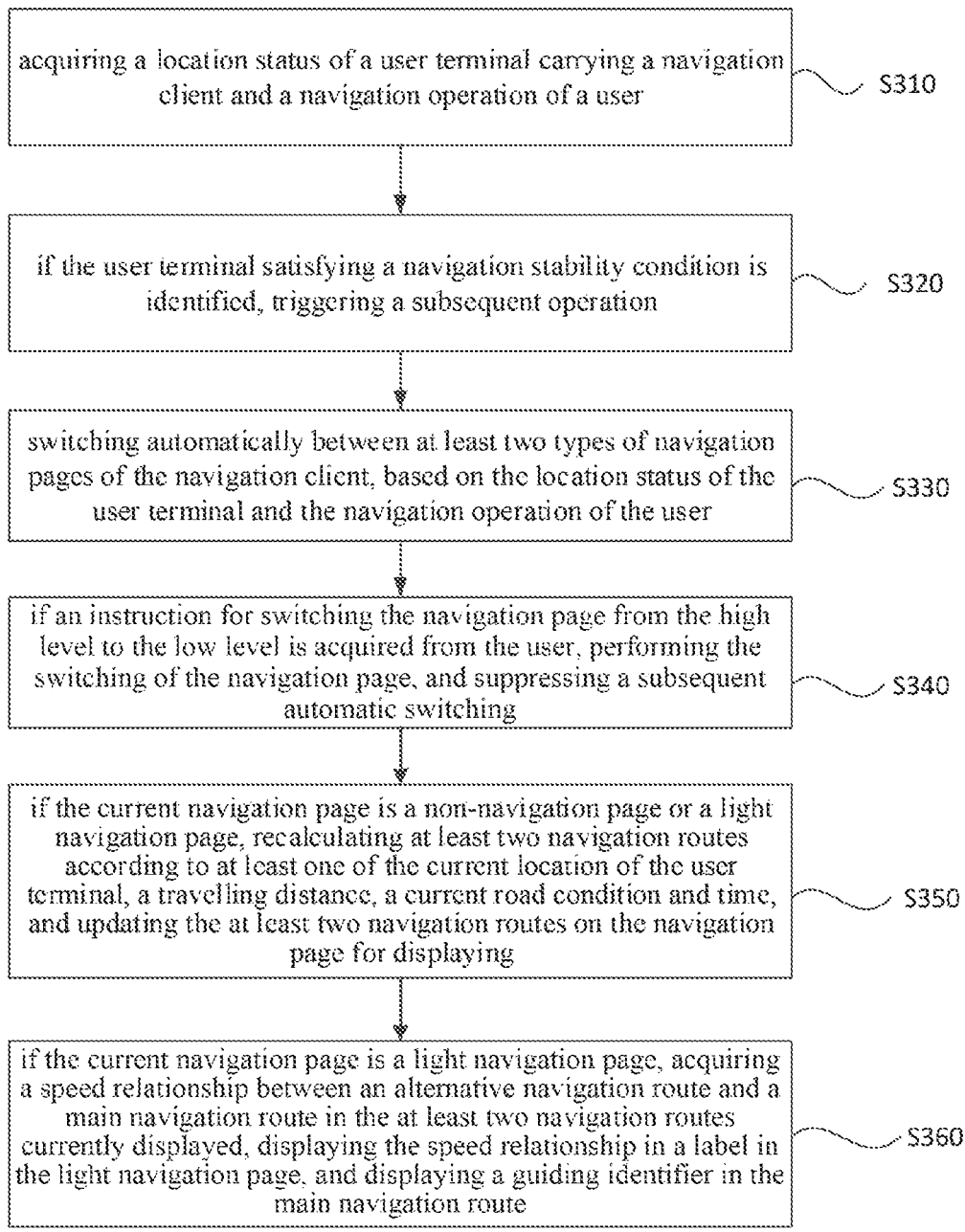
FIG. 3 is a flowchart of a map based navigation method according to the third embodiment of the present disclosure.

FIG. 3 is a flowchart of a map based navigation method according to the third embodiment of the present disclosure. Based on the above embodiments, the method further includes: if the current navigation page is a non-navigation page or a light navigation page, recalculating at least two navigation routes according to at least one of the current location of the user terminal, a travelling distance, a current road condition and time, and updating the at least two navigation routes on the navigation page for displaying.

Thus, by updating the non-navigation page or the light navigation page, the user can promptly learn the current navigation information, for the convenience of the user.

Further, the method further includes: if the current navigation page is a light navigation page, acquiring a speed relationship between an alternative navigation route and a main navigation route in the at least two navigation routes currently displayed, and displaying the speed relationship in a label in the light navigation page; and if the current navigation page is a light navigation page, displaying a guiding identifier in the main navigation route.

Thus, by displaying the speed relationship between the alternative navigation route and the main navigation route in the light navigation page, enabling the user to have more route selections, and to learn more navigation information, by displaying the guiding identifier of the main navigation route in the light navigation page, the present embodiment facilitates the proper driving of the user.

As shown in FIG. 3, the specific technical solution provided by the present embodiment is as follows:

S310: acquiring a location status of a user terminal carrying a navigation client and a navigation operation of a user.

S320: if the user terminal satisfying a navigation stability condition is identified, triggering a subsequent operation.

S330: switching automatically between at least two types of navigation pages of the navigation client, based on the location status of the user terminal and the navigation operation of the user.

S340: if an instruction for switching the navigation page from the high level to the low level is acquired from the user, performing the switching of the navigation page, and suppressing a subsequent automatic switching.

S350: if the current navigation page is a non-navigation page or a light navigation page, recalculating at least two navigation routes according to at least one of the current location of the user terminal, a travelling distance, a current road condition and time, and updating the at least two navigation routes on the navigation page for displaying.

In the present embodiment, after the user terminal drives for a certain distance or for a certain time period, the information such as road condition in the navigation route is different from the information when the user terminal starts. Accordingly, it is necessary to recalculate at least two navigation routes according to at least one of the current location of the user terminal, the travelling distance, the current road condition or the time, and to update the at least two navigation routes to the current navigation page. The current navigation page may be a non-navigation page or a light navigation page.

In the present embodiment, when only one navigation route in the navigation page is displayed, it is also necessary to recalculate at least two navigation routes according to at least one of the current location of the user terminal, the travelling distance, the current road condition or the time. When the user terminal deviates from the navigation route, the user is reminded by an identifier, for example, by highlighting the main navigation route. In the light navigation page, the user may also be reminded by the voice broadcast.

Specifically, at least two navigation routes may be recalculated according to the current location of the user terminal and the destination, or at least two navigation routes may be calculated according to the current location of the user terminal, the current road condition and the destination. Here, the current road condition includes information such as the number of vehicles on the route in the navigation page and the traffic handling condition. According to the travelling distance or the travelling time of the user terminal, the distance between the user terminal and the destination in the navigation route may be known, so as to determine the location of the user terminal and finally recalculate the at least two navigation routes.

S360: if the current navigation page is a light navigation page, acquiring a speed relationship between an alternative navigation route and a main navigation route in the at least two navigation routes currently displayed, displaying the speed relationship in a label in the light navigation page, and displaying a guiding identifier in the main navigation route.

In the present embodiment, in the light navigation page, the speed relationship between the alternative navigation route and the main navigation route may be expressed by time, distance, or the like. For example, the main navigation route may be 10 minutes faster than the alternative navigation route, or the main navigation route is 10 kilometers shorter than the alternative navigation route. In another example, the main navigation route is 30 minutes, the alternative navigation route is 40 minutes; or the main navigation route is 30 kilometers, the alternate navigation route is 20 kilometers. In the main navigation route, a guiding identifier is displayed. The guiding identifier may be a graph guiding identifier, or may also be a text guiding identifier. The guiding identifier may guide the user terminal to drive properly.

It should be noted that the steps S350 and S360 are illustratively performed after the S340 in the embodiments of the present disclosure. However, the embodiment of the present disclosure is merely an example, the steps S350 and S360 may be performed before or after any other steps.

The present embodiment provides a map based navigation method, by updating a non-navigation page or a light navigation page, enabling the user to learn promptly the current navigation information for the convenience of the user; by displaying the speed relationship between the alternative navigation route and the main navigation route in the light navigation page, enabling the user to have more route selections and to learn more navigation information, by displaying the guiding identifier of the main navigation route in the light navigation page, facilitating the proper driving of the user.

The Fourth Embodiment

Figure 4:
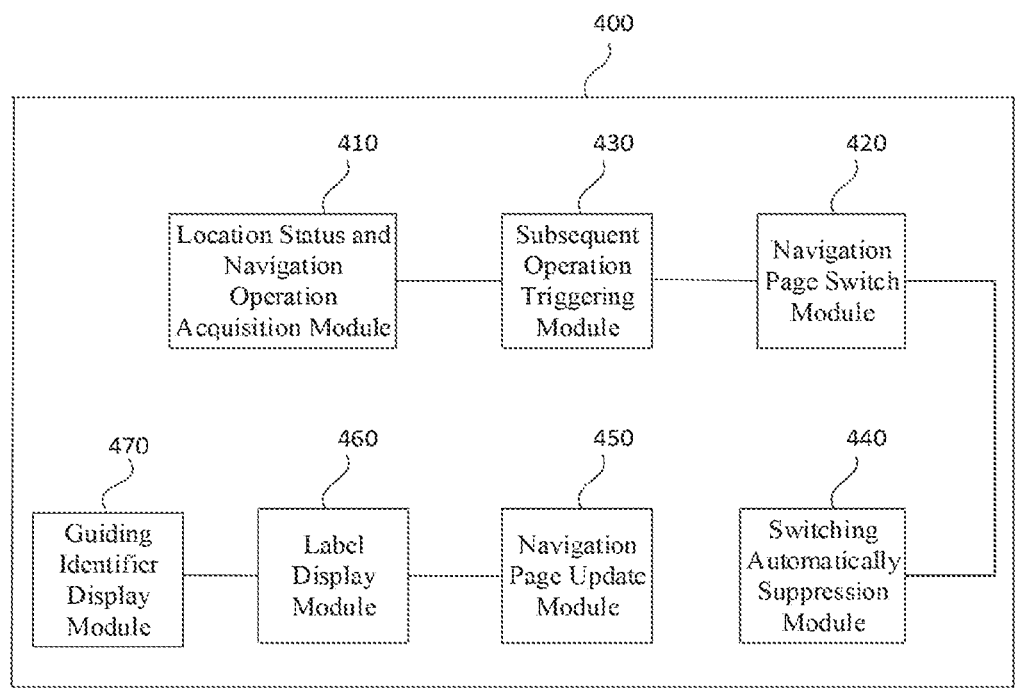
FIG. 4 is a structural block diagram of a map based navigation apparatus according to the fourth embodiment of the present disclosure.

FIG. 4 is a structural block diagram of a map based navigation apparatus according to the fourth embodiment of the present disclosure. By map navigating using the apparatus, as shown in FIG. 4, the apparatus 400 includes: a location status and navigation operation acquisition module 410 and a navigation page switch module 420.

Here, the location status and navigation operation acquisition module 410 is configured to acquire a location status of a user terminal carrying a navigation client and a navigation operation of a user; and the navigation page switch module 420 is configured to switch automatically between at least two types of navigation pages of the navigation client, based on the location status of the user terminal and the navigation operation of the user.

Further, the navigation page switch module 420 is specifically configured to:

switch, if the location status of the user terminal satisfies a condition of driving in a navigation route, a current navigation page is stayed on for a first set time threshold value, and if the user has no operation on the current navigation page for a preset time before the switching, from the current navigation page at a low level to a navigation page at a high level, wherein levels of the at least two types of navigation pages are arranged in ascending order of an amount of navigation information. The navigation page at a low level is a non-navigation page, and the navigation page at a high level is a light navigation page.

Further, the determine the location status of the user terminal satisfies the condition of driving in the navigation route includes: if a current location of the user terminal is located at a start of the navigation route, and a travelling speed of the user terminal reaches a vehicle driving speed value, determine the location status of the user terminal satisfies the condition of driving in the navigation route.

Further, the apparatus also includes: a subsequent operation triggering module 430, configured to, before switching automatically between at least two types of navigation pages of the navigation client, based on the location status of the user terminal and the navigation operation of the user, if the user terminal satisfying a navigation stability condition is identified, trigger a subsequent operation.

Here, the navigation stability condition includes at least one of the following: GPS positioning information in a set time length is continuously acquired; and travelling location of the user terminal on the current navigation page reaches a set distance threshold value.

Further, the apparatus also includes:

an switching automatically suppression module 440, configured to, if an instruction for switching the navigation page from the high level to the low level is acquired from the user, perform a switching of the navigation page, and suppress a subsequent automatic switching.

Further, the apparatus also includes:

a navigation page update module 450, configured to, if the current navigation page is a non-navigation page or a light navigation page, recalculate at least two navigation routes according to at least one of the current location of the user terminal, a travelling distance, a current road condition and time, and update the at least two navigation routes on the navigation page for displaying.

Further, the apparatus also includes:

a label display module 460, configured to, if the current navigation page is a light navigation page, acquire a speed relationship between an alternative navigation route and a main navigation route in the at least two navigation routes currently displayed, and display the speed relationship in a label in the light navigation page; and a guiding identifier display module 470, configured to, if the current navigation page is a light navigation page, display a guiding identifier in the main navigation route.

The above product may perform the method provided by any embodiment of the present disclosure, and has the corresponding functional modules and beneficial effects of performing the method.

The map based navigation apparatus provided by the present embodiment achieves an automatic switching between at least two types of navigation pages of the client based on the location status of the user terminal and the navigation operation of the user, and satisfies different needs of the user in different situations.

The Fifth Embodiment

Figure 5:
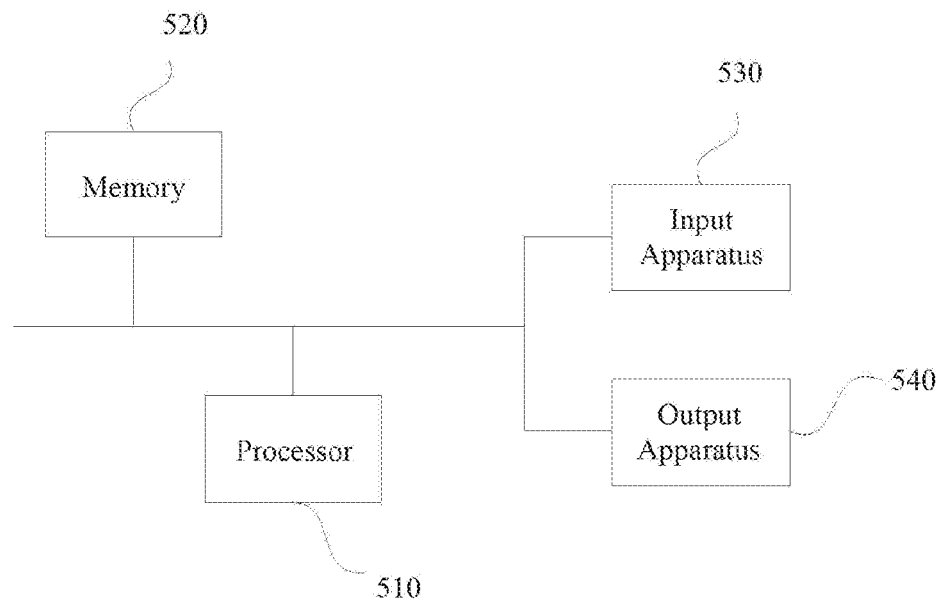
FIG. 5 is a schematic diagram of a hardware structure of a terminal according to the fifth embodiment of the present disclosure.

The fifth embodiment of the present disclosure provides a terminal, which includes the map-based navigation apparatus provided by any embodiment of the present disclosure. Specifically, as shown in FIG. 5, the embodiments of the present disclosure provide a terminal, the terminal includes:

one or more processors 510, and one processor 510 is taken as an example in FIG. 5;

a memory 520; and one or more modules.

The terminal may further include: an input apparatus 530 and an output apparatus 540. The processor 510, the memory 520, the input apparatus 530 and the output apparatus 540 in the terminal may be connected via a bus or in other manners. FIG. 5 takes the connection via a bus as an example.

As a computer readable storage medium, the memory 520 may be used for storing software programs, computer executable programs and modules, for example, program instructions/modules corresponding to the map based navigation method in the embodiments of the present disclosure (for example, the location status and navigation operation acquisition module 410 and navigation page switch module 420 in the map based navigation apparatus shown in FIG. 4). The processor 510 runs the software programs, instructions, and modules stored in the memory 520 to execute various function applications and data processing of the server, so as to implement the map based navigation method as discussed in the above method embodiment.

The memory 520 may include a program storage area and a data storage area. The program storage area may store an operating system and an application program for at least one function. The data storage area may store data created according to the use of the terminal, and the like. In addition, the memory 520 may include a high speed random access memory, and may further include a non-volatile memory, for example, at least one magnetic disk storage device, flash memory device, or other non-volatile solid state storage device. In some embodiments, the memory 520 may further include memories disposed remote to the processors 510. These remote memories may be connected to the terminal through a network. Examples of the network include, but are not limited to, the Internet, an enterprise intranet, a local area network, a mobile communication network, and a combination thereof.

The input apparatus 530 may be used for receiving input digital or character information, and generating key signal inputs related to user settings of the terminal and the function control. The output apparatus 540 may include a display screen or other display devices.

The embodiments of the present disclosure further provide a storage medium containing computer executable instructions for executing a map based navigation method when executed by a computer processor, the method includes:

acquiring a location status of a user terminal carrying a navigation client and a navigation operation of a user; and switching automatically between at least two types of navigation pages of the navigation client, based on the location status of the user terminal and the navigation operation of the user.

According to the descriptions of the above embodiments, those skilled in the art may clearly understand that the present disclosure may be implemented by means of software and necessary general-purpose hardware, and may be implemented, obviously, by means of hardware. However, the former is a preferred implementation in most circumstances. Based on such understanding, the technical solution of the present disclosure essentially, or the part contributing to the prior art may be embodied in the form of a software product. The computer software product may be stored in a computer readable storage medium, such as a floppy disk, a Read-Only Memory (ROM), a Random Access Memory (RAM), a flash memory, a hard disk or an optical disk of a computer, and includes several instructions for enabling a computer device (which may be a personal computer, a server, or a network device, and the like) to execute the method described in the embodiments of the present disclosure.

It should be noted that, in the above embodiments of the map based navigation apparatus, the units and modules included are merely divided according to a functional logic, but the present disclosure is not limited to the above division, as long as the corresponding functions can be achieved. In addition, the specific names of the functional units are merely used for distinguishing, and are not intended to limit the protection scope of the present disclosure.

The above descriptions are merely specific embodiments of the present disclosure, and the protection scope of the present disclosure is not limited thereto. Any changes or replacements that can be easily conceived of by those skilled in the art within the technical scope disclosed by the present disclosure should be covered by the protection scope of the present disclosure. Therefore, the protection scope of the present disclosure should be based on the protection scope of the claims.

What is claimed is:

1. A map based navigation method, the method comprising:

acquiring a location status of a user terminal carrying a navigation client and a navigation operation of a user on a given navigation interface of the user terminal; and switching automatically between at least two types of navigation pages of the navigation client, based on the location status of the user terminal and the navigation operation of the user, wherein the switching automatically between at least two types of navigation pages of the navigation client, based on the location status of the user terminal and the navigation operation of the user comprises:

in response to determining that the location status of the user terminal satisfies a condition of driving in a navigation route, a current navigation page is stayed on for a first set time threshold value, and the user has no operation on the current navigation page for a preset time before the switching, switching from the current navigation page at a low level to a navigation page at a high level on the given navigation interface, wherein levels of the at least two types of navigation pages are arranged in ascending order of an amount of navigation information, wherein each of the current navigation page at the low level and the navigation page at the high level is presented on the given navigation interface of the user terminal, and wherein the navigation page at the high level includes more navigation information than the current navigation page at the low level, and wherein the method is performed by at least one hardware processor.

2. The method according to claim 1, wherein determining the location status of the user terminal satisfies the condition of driving in the navigation route comprises: in response to determining that a current location of the user terminal is located at a start of the navigation route, and a travelling speed of the user terminal reaches a vehicle driving speed value, determining the location status of the user terminal satisfies the condition of driving in the navigation route.

3. The method according to claim 1, wherein before switching automatically between at least two types of navigation pages of the navigation client, based on the location status of the user terminal and the navigation operation of the user, the method further comprises:

in response to determining that the user terminal satisfying a navigation stability condition is identified, triggering a subsequent operation.

4. The method according to claim 3, wherein the navigation stability condition comprises at least one of:

GPS positioning information in a set time length is continuously acquired; and a travelling location of the user terminal on the current navigation page reaches a set distance threshold value.

5. The method according to claim 1, wherein the navigation page at the low level is a non-navigation page, and the navigation page at the high level is a light navigation page.

6. The method according to claim 1, wherein the method further comprises:

in response to determining that an instruction for switching the navigation page from the high level to the low level is acquired from the user, performing the switching of the navigation page, and suppressing a subsequent automatic switching.

7. The method according to claim 1, wherein the method further comprises:

in response to determining that a current navigation page is a non-navigation page or a light navigation page, recalculating at least two navigation routes according to at least one of a current location of the user terminal, a travelling distance, a current road condition and time, and updating the at least two navigation routes on the navigation page for displaying.

8. The method according to claim 7, wherein the method further comprises:

in response to determining that a current navigation page is a light navigation page, acquiring a speed relationship between an alternative navigation route and a main navigation route in the at least two navigation routes currently displayed, and displaying the speed relationship in a label in the light navigation page; and in response to determining that the current navigation page is a light navigation page, displaying a guiding identifier in the main navigation route.

9. The method according to claim 1, wherein the current navigation page at the low level includes a first area of a map and the navigation page at the high level includes a second area of the map, the first area being larger than and including the second area.

10. A map based navigation apparatus, the apparatus comprising:

at least one processor; and a memory storing instructions, the instructions when executed by the at least one processor, cause the at least one processor to perform operations, the operations comprising:

acquiring a location status of a user terminal carrying a navigation client and a navigation operation of a user on a given navigation interface of the user terminal; and switching automatically between at least two types of navigation pages of the navigation client, based on the location status of the user terminal and the navigation operation of the user, wherein the switching automatically between at least two types of navigation pages of the navigation client, based on the location status of the user terminal and the navigation operation of the user comprises:

in response to determining that the location status of the user terminal satisfies a condition of driving in a navigation route, a current navigation page is stayed on for a first set time threshold value, and the user has no operation on the current navigation page for a preset time before the switching, switching from the current navigation page at a low level to a navigation page at a high level on the given navigation interface, wherein levels of the at least two types of navigation pages are arranged in ascending order of an amount of navigation information, wherein each of the current navigation page at the low level and the navigation page at the high level is presented on the given navigation interface of the user terminal, and wherein the navigation page at the high level include more navigation information than the current navigation page at the low level.

11. The apparatus according to claim 10, wherein:

determining the location status of the user terminal satisfies the condition of driving in the navigation route comprises: in response to determining that a current location of the user terminal is located at a start of the navigation route, and a travelling speed of the user terminal reaches a vehicle driving speed value, determining the location status of the user terminal satisfies the condition of driving in the navigation route.

12. The apparatus according to claim 10, wherein before switching automatically between at least two types of navigation pages of the navigation client, based on the location status of the user terminal and the navigation operation of the user, the operations further comprise:

in response to determining that the user terminal satisfying a navigation stability condition is identified, triggering a subsequent operation.

13. The apparatus according to claim 12, wherein the navigation stability condition comprises at least one of:

GPS positioning information in a set time length is continuously acquired; and a travelling location of the user terminal on the current navigation page reaches a set distance threshold value.

14. The apparatus according to claim 10, wherein the navigation page at the low level is a non-navigation page, and the navigation page at the high level is a light navigation page.

15. The apparatus according to claim 10, wherein the operations further comprise:
in response to determining that an instruction for switching the navigation page from the high level to the low level is acquired from the user, performing a switching of the navigation page, and suppressing a subsequent automatic switching.

16. The apparatus according to claim 10, wherein the operations further comprise:
in response to determining that the current navigation page is a non-navigation page or a light navigation page, recalculating at least two navigation routes according to at least one of the current location of the user terminal, a travelling distance, a current road condition or time, and updating the at least two navigation routes on the navigation page for displaying.

17. The apparatus according to claim 16, wherein the operations further comprise:
in response to determining that the current navigation page is a light navigation page, acquiring a speed relationship between an alternative navigation route and a main navigation route in the at least two navigation routes currently displayed, and displaying the speed relationship in a label in the light navigation page; and
in response to determining that the current navigation page is a light navigation page, displaying a guiding identifier in the main navigation route.

18. A non-transitory computer storage medium storing a computer program, the computer program when executed by one or more processors, causes the one or more processors to perform operations, the operations comprising:
acquiring a location status of a user terminal carrying a navigation client and a navigation operation of a user on a given navigation interface of the user terminal; and
switching automatically between at least two types of navigation pages of the navigation client, based on the location status of the user terminal and the navigation operation of the user
wherein the switching automatically between at least two types of navigation pages of the navigation client, based on the location status of the user terminal and the navigation operation of the user comprises:
in response to determining that the location status of the user terminal satisfies a condition of driving in a navigation route, a current navigation page is stayed on for a first set time threshold value, and the user has no operation on the current navigation page for a preset time before the switching, switching from the current navigation page at a low level to a navigation page at a high level on the given navigation interface, wherein levels of the at least two types of navigation pages are arranged in ascending order of an amount of navigation information, wherein each of the current navigation page at the low level and the navigation page at the high level is presented on the given navigation interface of the user terminal, and wherein the navigation page at the high level include more navigation information than the current navigation page at the low level.

* * * * *